3,004,834
METHOD OF PROCESSING PHOSPHORUS SLUDGE OBTAINED IN THE PRODUCTION OF PHOSPHORUS
Heinz Harnisch, Koln, Friedbert Ritter, Buschhof, near Konigswinter, and Franz Rodis, Knapsack, near Koln, all in Germany, assignors to Knapsack-Griesheim Aktiengesellschaft, Knapsack, near Koln, Germany, a corporation of Germany
No Drawing. Filed May 28, 1958, Ser. No. 738,315
Claims priority, application Germany Aug. 3, 1957
7 Claims. (Cl. 23—293)

This invention relates to a method of processing phosphorus sludge as obtained in the production of phosphorus.

The production of phosphorus in a furnace implies the evolution of a phosphorus furnace gas, and it is known that by condensing this gas a minor portion of phosphorus is obtained in the form of a phosphorus sludge. In addition thereto, the water injected into the condenser for cooling purposes retains, as a rule, about 50 to 1000 milligrams of suspended and partially colloidally dissolved phosphorus which likewise deposits in the phosphorus reservoirs, waste pipes and settling tanks in sludgy form. Such sludges contain varying quantities of elementary phosphorus and in addition thereto films of oxide of partially oxidized phosphorus, substantial amounts of water and some dust. At a stronger pH value, the condensation water or waste water which always contains dissolved phosphoric acid and $Ca^{++}$ and $SiF_6^{--}$ ions gives rise to the precipitation of calcium phosphates, silicic acid and calcium fluoride which also appear in the sludge.

Processing the sludgy masses so obtained is of some interest not only with a view to the phosphorus which they contain, but also in view of the fact that they involve the danger of fire and intoxication so that it is necessary at least to inactivate these sludgy masses.

In the production of phosphoric acid, it has already been proposed to admix the sludge, unless it is too strongly contaminated or concentrated, in a certain proportion with liquid phosphorus, and to burn this mixture to obtain $P_2O_5$. Strongly contaminated or strongly concentrated sludges, however, cannot be processed in the manner described.

Attempts have also been made to subject the sludges to a distillation in an externally heated retort. The retort method is, however, beset with the following disadvantages: on the one hand the retort method involves some danger since cloggings in the retort produce very high pressures which may entail explosions, and on the other hand concentrated metaphosphoric acid is retained after distillation which strongly corrodes the retort. It should also be noted that phosphorus obtained in this manner is not very pure, so that the retort method is absolutely uneconomical.

It has also been proposed to subject phosphorus to a steam distillation under atmospheric pressure. It has been found, however, that in addition to the steam theoretically required, i.e. about 28 kg. of steam per kilogram of distilled phosphorus, a further considerable amount of steam is necessary, especially when low-phosphorus and strongly contaminated sludges are concerned, to separate the phosphorus at least approximately quantitatively. Tests have shown that up to 180 kg. of steam per kilogram of distilled phosphorus are necessary to obtain a residual sludge which is approximately free from phosphorus and which can then be withdrawn through a sewerage system in a harmless manner. It is assumed that the high consumption of steam is caused by the fact that the phosphorus particles are partially enveloped in dirt particles and oxide films so that the vapor pressure of pure phosphorus can no longer appear, not even approximately, in the steam passed through. This implies a further strong reduction of the distillation velocity which is already very slow in view of the low vapor pressure of phosphorus at about 100° C.

It has now surprisingly been found and this has been confirmed by numerous tests that the aforesaid disadvantages can be avoided by subjecting sludge masses containing phosphorus to a steam distillation under superatmospheric pressure.

According to the invention, a phosphorus-containing sludge as obtained in the production of phosphorus is subjected to a steam distillation under superatmospheric pressure, and pure yellow phosphorus is then separated from the phosphorus-steam-condensate obtained. The distillation is carried out at a temperature above 100° C., preferably at a temperature within the range of about 140° C. and about 180° C. and under a pressure of between about 2 atmospheres absolute and about 20 atmospheres absolute, preferably under a pressure of between about 4 atmospheres absolute and about 10 atmospheres absolute. For example, the distillation may be carried out at a temperature of about 160° C. and under a pressure of about 7 atmospheres absolute.

The distillation temperature is generally produced by direct introduction of superheated steam into the distillation sump.

The condensation temperature is preferably somewhat above 45° C. The condensation and separation of the pure yellow phosphorus are carried out in an inert atmosphere, for example under nitrogen.

According to a further feature of the invention the distillation pressure can be regulated by a throttle valve installed between the stage of condensation and the stage of distillation, the stage of condensation being kept, for example under atmospheric pressure which is advantageous for removing the phosphorus formed. It is, however, also possible to operate under conditions such that about the same pressure prevails in the stage of distillation and the stage of condensation.

The distillation pressure can be regulated at a predetermined adjustment of the throttle valve by regulating the velocity with which the steam is introduced into the distillation sump.

The process of the invention which is carried out under superatmospheric pressure in contradistinction to the known steam distillation which is carried out under atmospheric pressure, offers the advantage that the excess of steam required beyond the theoretical amount is considerably reduced.

Under a pressure of about 7 atmospheres absolute, the amount of steam theoretically required is for example 18.5 kg. of steam per kilogram of distilled phosphorus. Even when low phosphorus sludges are concerned, it suffices already to use about 35–40 kg. of steam per kilogram of phosphorus to obtain a residual sludge, which is practically free from phosphorus and can immediately be withdrawn through the sewerage system. Sludges which are rich in phosphorus enable the amounts of steam necessary to be reduced practically to down to the theoretical amount, apart from the quantity of steam required in the end phase of the distillation. Under a pressure of 7 atmospheres absolute, the theoretical amount is for example 18.5 kg. of steam per kilogram of distilled phosphorus, while 19.0 kg. of steam are necessary in the process of this invention.

By good adjustment of the vapor pressure equilibrium of the phosphorus in a pressure distillation, the period necessary to carry out the distillation is considerably shortened as compared with a distillation carried out at atmospheric pressure. Due to the considerably higher vapor pressure of phosphorus in a pressure distillation, the distillation velocity is considerably greater from the beginning than that in a distillation carried out at atmospheric pressure.

It should also be noted that the phosphorus obtained by a pressure distillation is considerably purer than that produced for example by the retort distillation method. Contrary to the retort distillation, the pressure distillation by means of steam is absolutely safe in operation due to the fact that the distilling vessel must only withstand in the extreme case the full pressure of the steam conduit. This pressure can, however, be regulated with certainty. Attention should also be paid to the fact that in the pressure distillation the sludge is not evaporated to dryness as in the retort method, so that a corrosion of the apparatus by concentrated solutions of metaphosphoric acid is not liable to occur.

In view of the bad experiences gained in other distillation processes, especially in the steam distillation at atmospheric pressure, the pressure distillation of phosphorus sludge by means of steam could not be expected to involve such considerable advantage. Although phosphorus and hence phosphorus sludge have been produced on an industrial scale for more than 50 years, it has been impossible prior to this invention to process phosphorus sludge in a satisfactory, safe and economic manner.

In the following the process of the invention is described in greater detail.

Phosphorus sludge is introduced into the vessel of a pressure distillation apparatus. The vessel is closed and heated with a suitable heating device, for example by direct introduction of steam, to the distillation temperature which is above 100° C.

As soon as the distillation temperature has been reached, for example 160° C., the slide valve between vessel and condenser is opened, so that the steam can escape together with the phosphorus vapor via a throttle valve into the condenser.

The velocity with which the steam is introduced is so regulated that at a predetermined adjustment of the throttle valve the desired pressure of, for example 7 atmospheres absolute, is attained in the distilling vessel. Phosphorus vapor and steam are jointly condensed in the condenser. The temperature in the condenser is preferably kept at above about 45° C. so that the phosphorus separated in the liquid state runs from the cooling surfaces into the receiver. Nitrogen is passed through the receiver and, if desired, also through the exit of the condenser in order to prevent inflammation of the phosphorus.

The following examples serve to illustrate the invention, but they are not intended to limit it thereto:

Example 1

20 kg. of a sludge containing 0.01 kg. of phosphorus per kg. of sludge, i.e. 1% by weight of phosphorus, were introduced into the distilling vessel and heated to 161° C. in the manner described above. At that temperature and under a pressure of 7 atmospheres absolute 7.80 kg. of steam were introduced through the vessel and subsequently deposited in the condenser which was kept under atmospheric pressure. The 7.80 kg. of steam were used to expel the 0.2 kg. of phosphorus contained in the sludge and pure yellow phosphorus was obtained in the receiver after condensation.

The amount of steam necessary was 39 kg. of steam per kg. of distilled phosphorus. The residual sludge retained in the vessel was practically free from phosphorus (negative Mitscherlich test).

Example 2

20 kg. of a sludge containing 62% by weight of phosphorus were distilled at 161° C. under a pressure of 7 atmospheres absolute in the manner described above.

12.3 kg. of very pure phosphorus and 395 kg. of steam condensate were obtained in the receiver. The steam consumption was accordingly 32 kg. of steam per kg. of distilled phosphorus.

The residual sludge retained in the vessel was practically free from phosphorus.

Example 3

1200 kg. of a sludge containing 26% by weight of phosphorus (310 kg. of phosphorus) were distilled with steam in the manner described above at a temperature of 181° C. and under a pressure of 11 atmospheres absolute.

302 kg. of phosphorus were obtained in the receiver. The steam consumption was 21.5 kg. per kg. of distilled phosphorus. The residual sludge retained in the distilling vessel was practically free from phosphorus.

We claim:
1. A method for processing phosphorus sludge obtained in the production of phosphorus, which comprises steam distilling a phosphorus-containing aqueous sludge wherein the phosphorus particles are partially encased by contamination particles at a temperature of above about 100° C. and under a pressure of between 2 atmospheres absolute and about 20 atmospheres absolute, condensing the phosphorus vapor and steam, and separating pure yellow phosphorus from the phosphorus-steam-condensate, said condensation and separation of phosphorus being carried out in an inert atmosphere.

2. The method of claim 1, which comprises carrying out the distillation at a temperature within the range of about 140° C. and about 180° C. and under a pressure of between about 4 atmospheres absolute and about 10 atmospheres absolute.

3. The method of claim 2, which comprises carrying out the distillation at a temperature of about 160° C. and under a pressure of about 7 atmospheres absolute.

4. The method of claim which comprises producing the distillation temperature by direct introduction of superheated steam into the phosphorus-containing aqueous sludge.

5. The method of claim 1, wherein the condensation temperature is above about 45° C.

6. The method of claim 1, wherein the condensation and separation of pure yellow phosphorus are carried out in a nitrogen atmosphere.

7. The method of claim 1, wherein the condensation is carried out under atmospheric pressure.

References Cited in the file of this patent

UNITED STATES PATENTS

| | | |
|---|---|---|
| 1,984,674 | Fiske et al. | Dec. 18, 1934 |
| 2,135,486 | Almond | Nov. 8, 1938 |

FOREIGN PATENTS

| | | |
|---|---|---|
| 524,289 | Great Britain | Aug. 2, 1940 |